United States Patent
Puri et al.

(10) Patent No.: US 6,260,043 B1
(45) Date of Patent: Jul. 10, 2001

(54) AUTOMATIC FILE FORMAT CONVERTER

(75) Inventors: Sunil Puri, Bellevue; James W. Elder, Redmond; William Clifford Hunter, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/187,956

(22) Filed: Nov. 6, 1998

(51) Int. Cl.⁷ .................................................. G06F 17/30
(52) U.S. Cl. ................................ 707/101; 707/1; 707/200
(58) Field of Search .............................. 707/101, 1, 200

(56) References Cited

U.S. PATENT DOCUMENTS

| | | | |
|---|---|---|---|
| 5,765,169 | * 6/1998 | Conner | 707/200 |
| 5,806,085 | * 9/1998 | Berliner | 711/113 |
| 5,819,062 | * 10/1998 | Srikantappa | 716/11 |
| 5,983,240 | * 11/1999 | Shoroff et al. | 707/200 |
| 6,092,114 | * 7/2000 | Shaffer et al. | 709/232 |

\* cited by examiner

Primary Examiner—Jack Choules
Assistant Examiner—Cheryl Lewis
(74) Attorney, Agent, or Firm—Kilpatrick Stockton LLP

(57) ABSTRACT

Determining, prior to operation of an application program module, that a foreign file format is fully convertible to a native file format. Full conversion of the foreign file format means that a significant majority of the style and presentation of the content of the foreign file are preserved after conversion to the native file format. Prior to an attempted file conversion by the application program module, the filename extension of the foreign file is examined. If the filename extension is recognized as indicating that the foreign file is fully convertible, the application program module is commanded to access and convert the foreign file to the native file format. If the filename extension does not indicate that the foreign file is fully convertible, a determination is made as to whether the filename extension is registered in an operating system registry. If the filename extension is registered, it is considered not to a WordPerfect file and is ignored. If no determination can be made from the filename extension as to whether the foreign file is fully convertible and the filename extension is not registered, the internal structure of the foreign file is examined. If examination of the internal structure of the foreign file reveals that it is fully convertible, the application program module is commanded to access and convert the foreign file to the native file format. When no determination can be made, either from the filename extension or the internal file structure, that the foreign file is fully convertible, the file is ignored and no conversion is attempted by the application program module.

15 Claims, 4 Drawing Sheets

AUTOMATIC FILE FORMAT CONVERTER

TECHNICAL FIELD

The present invention relates generally to the detection of a file format of a computer file. More particularly, the present invention relates to the detection of a foreign file format and conversion from the foreign file format to a native file format.

BACKGROUND OF THE INVENTION

A file format is the internal structure of a file that defines the way in which the file is stored. Application program modules typically create files that have a unique native file format. A file format may include various types of control instructions and codes used by application program modules and hardware devices. As an example, Microsoft Corporation's WORD application program module creates word processing documents in a native file format commonly known as "WORD format." Similarly, Novell Incorporated's WordPerfect application program module creates word processing documents in a native file format commonly known as "WordPerfect format." The native file format of one application program is generally distinct from and incompatible with the native file formats of other application programs.

The end-user's desire for compatibility has given rise to the practice of file format conversion. Most modern application program modules, including WORD and WordPerfect, are equipped with program modules, functions or routines, generally known as "converters." Converters provide functionality to enable an application program module to convert a file from a foreign format into a native file format. Converters are well known in the art for almost any type of application program module, including word processing programs, spreadsheet programs, graphic editing programs, desktop publishing programs, etc.

Converters may be operable to convert from a variety of foreign file formats. Converters thus provide an application program module with the ability to open files created by many different application program modules, including different versions of those applications. A converter will generally include a function or routine, referred to herein as a "recognition" function, that is operable to examine a foreign file to determine whether the converter is able to fully convert the foreign file format to a native file format, i.e. convert the foreign file without losing much, if any, of the style and presentation of its content. Generally, such a recognition function is called by the converter in response to the converter being called by the application program.

A typical recognition function may include the capability to examine the filename extension of a foreign file. A filename extension is often used to indicate that a file is of a particular format. As such, a recognition function may be able to determine that a file may be fully converted by a converter through examination of the foreign file's filename extension. Additionally, some recognition functions are able to examine the internal structure of a foreign file to determine whether the foreign file format may be fully converted. In any event, in order to determine whether a particular file format may be fully converted, an application program must be operated, a converter must be called by the application program, and a recognition function must be called by the converter.

When a recognition function does not recognize a foreign file format as one that can be fully converted, either a text-only conversion is performed or the user is prompted to manually identify the file format or terminate the conversion. Text-only conversion is often undesirable because it is not a full conversion. In a text-only conversion, almost all of the style and presentation of the content of the foreign file is usually lost. Manual interaction by the user is particularly undesirable with respect to a batch conversion of many files. A batch may contain hundreds or thousands of files in formats that are not recognized by the recognition function as being fully convertible. Required user interaction for each such file causes significant time and effort to be wasted.

Presently, in order to ensure a full and uninterrupted file conversion, the user must have advance knowledge that a particular foreign file format can be fully converted by an application program's converter. If the foreign file format is known to be fully convertible by the converter, the user can predict that the converter will not default to a text-only conversion or prompt the user for input. Therefore, with respect to a full and uninterrupted batch conversion, the user is presently forced to manually select a set of files from a directory that are known to be of a recognizable format. For directories of sufficient size, the selection of recognizable files can be tedious and time consuming.

Accordingly, there remains a need for determining, without user interaction, whether a file is in a particular file format. There also remains a need for accomplishing the automatic selection of files for a batch conversion. There further is a need for pre-determining whether a file is in a particular format, prior to the an attempted conversion of the file by an application program.

SUMMARY OF THE INVENTION

The present invention fulfills the needs in the art by determining, without user interaction, whether a file is in a particular file format. The present invention also supports automatic selection of files for a batch conversion. The present invention can also pre-determine whether a file is in a particular format, prior to an attempted conversion of the file by an application program.

The present invention converts a file between a foreign file format and a native file format of a host application program module. A file comprises an internal file structure, a filename and a filename extension. A native file format is a file format that is fully compatible with the host application program module. A native file is a file having the native file format. A foreign file format is any file format that is not fully compatible with the host application program module. A foreign file is a file having a foreign file format. Accordingly, a native file may be read more quickly and efficiently by the host application than a foreign file.

The host application program module includes one or more converters for performing file conversion. Prior to attempting a conversion of the file with the host application program module, the present invention determines, without user interaction, that a foreign file is in the foreign file format. Upon determining that the foreign file is in the foreign file format and that there is a converter for converting it to a native file format, the present invention commands the host application program module to access the file. The host application program module is operable to call the converter to convert the file from the foreign file format to the native file format.

The present invention provides a pre-recognition function which is operable to determine whether a foreign file format is fully convertible to a native file format by a converter of an application program module. Full conversion of a foreign file format means that the style and presentation of the content of the foreign file are substantially maintained in the native file. The pre-recognition function operates on the foreign file prior to an attempted conversion of the foreign file by the application program module. Subsequently, the application program module is only commanded to access and convert the foreign file if the pre-recognition function has determined that the foreign file is fully convertible by the converter of the application program module. In this way, the conversion of the foreign file by the application program module is ensured to proceed uninterrupted and not require user interaction.

The pre-recognition function is called once for each foreign file in a directory. The pre-recognition function is operable to examine the filename extension of each foreign file to attempt to determine whether the foreign file format is fully convertible by the application program module. If no determination can be made by the filename extension as to whether the foreign file is fully convertible, the pre-recognition function examines the internal structure of the foreign file. The pre-recognition function is thus able to examine an entire directory of files, including subdirectories, to determine whether each file is fully convertible by the converter of an application program module. When the pre-recognition function determines that a foreign file is fully convertible by the converter of the application program module, the application program module is commanded to access and convert the foreign file to the native file format. When the pre-recognition function is unable to determine that the foreign file is fully convertible by the converter of the application program module, the foreign file is ignored and no conversion is attempted.

As mentioned, the pre-recognition function may be configured to determine not only whether a foreign file is fully convertible by the converter of an application program module, but also to automatically determine whether a foreign file is in a particular file format. In this way, a user may specify that only foreign files of a particular format are to be converted. The user is not required to identify each foreign file that is in the particular file format because the pre-recognition provides such functionality. Therefore, the present invention is able to automatically select for conversion a batch of files having a particular file format.

DETAILED DESCRIPTION

The present invention provides a system and method for efficiently converting one or more computer files from a foreign file format to a native file format. A native file format is a file format that is fully compatible with a host application program module. A native file is a file having a native file format. A foreign file format is any file format that is not fully compatible with the host application program module. A foreign file is a file having a foreign file format.

In operation, the present invention pre-determines whether a foreign file can be fully converted into a native file by the application program module which will be used to access the file. By "pre-determine," it is meant that the present invention will determine whether the foreign file format is fully convertible by the application program module prior to the foreign file being accessed by the application program module. As the application program module accesses the foreign file, it will attempt to use an internal converter to open and convert the foreign file. The present invention insures that the application program module will be able to convert the foreign file before valuable system resources (time, disk space, network bandwidth, etc.) are dedicated to invoking the application program and/or accessing the foreign file.

Since the present invention pre-determines that a foreign file will be fully convertible by a converter, the conversion of the foreign file is virtually guaranteed not to require any user interaction or to involve a text-only conversion. Thus, the benefits of the present invention are most greatly realized during a batch conversion operation. Prior to a batch conversion, the present invention has the ability to scan a directory of files and to identify each of those files that are in a format that may be fully converted by the converter of the application program module. Therefore, the user is not required to manually select the files in a directory that are to be included in a batch conversion. Further, the batch conversion will proceed uninterrupted until all fully convertible foreign files are converted.

Figure 1:
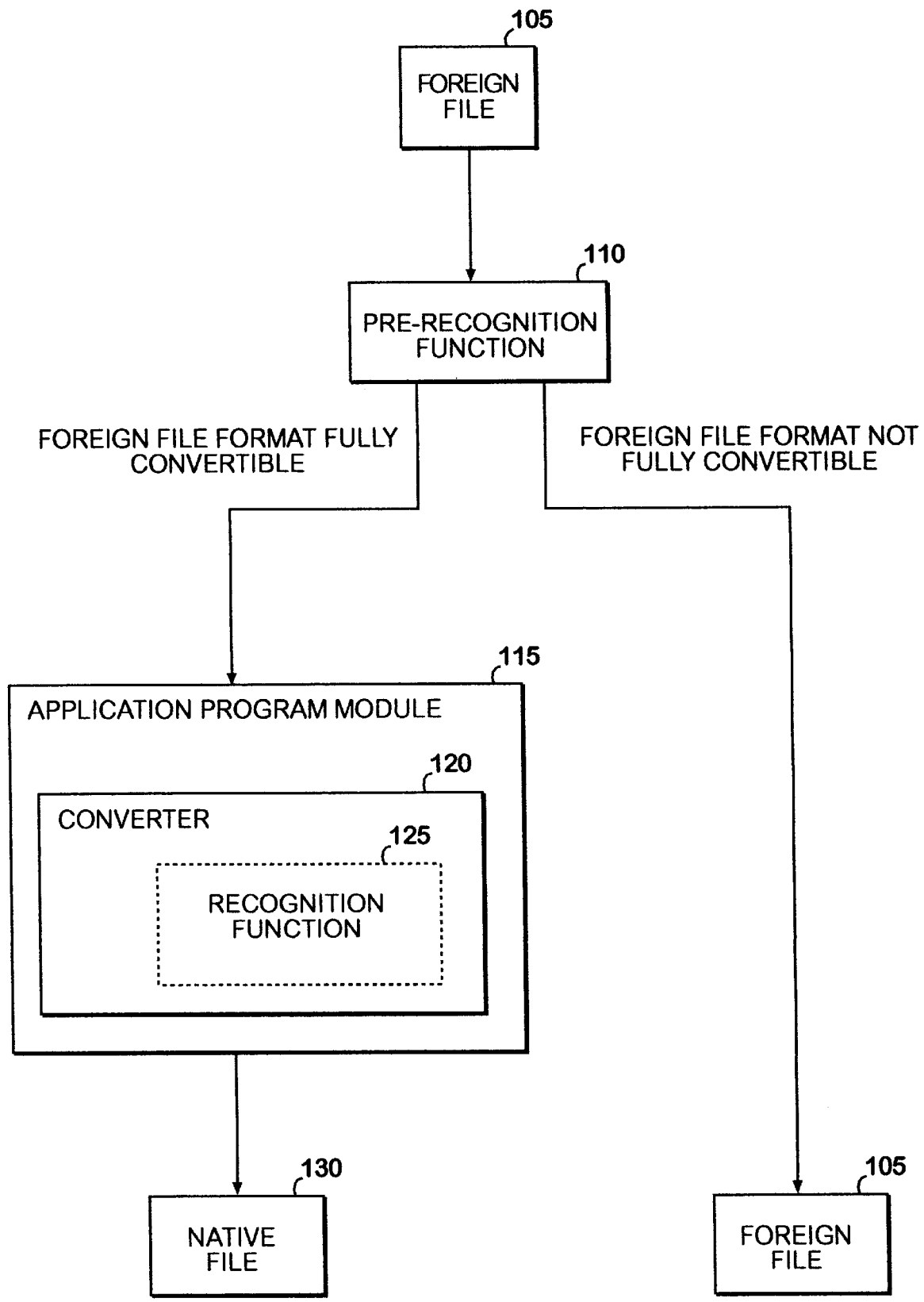
FIG. 1 is a functional block diagram that illustrates components of an exemplary embodiment of the present invention.

The following description will hereinafter refer to the drawing, in which like numerals indicate like elements throughout the several figures. FIG. 1 provides an abstract representation of the architecture of an exemplary embodiment of the present invention. An application program module 115 includes a converter 120, which can convert a foreign file 105 from a foreign file format to a native file format. The converter 120 may actually be external from the application program module 115, residing for example in a dynamic link library, etc. In the case of an external converter, the application program module 115 would include computer code, such as a function call, to access the converter. Still, for the sake of the following discussion, the converter 120 may be thought of as being included in the application program 115.

The converter 120 comprises a recognition function 125 that is operable to determine whether the foreign file format may be fully converted by the converter 120. As used herein, the phrase "full conversion" is intended to mean a conversion from a foreign file format to a native file format that significantly maintains the style and presentation of the contents of the foreign file. For example, a full conversion would cause the original margins, spacing, font face, font style, special characters, embedded objects, etc. of the foreign file to be maintained in the native file. As such, a text-only conversion is not considered a full conversion. The functionality of the recognition function 125 may also be performed directly by the converter 120.

A pre-recognition function 110 can pre-determine whether a foreign file format is fully convertible by the converter 120. The pre-recognition function 110 may be implemented as a program module, such as a stand-alone program module or a program module that is integrated into the application program module 115. In operation, the filename extension and/or the internal structure of the foreign file 105 is examined by the pre-recognition function 110. If the pre-recognition function 110 determines that the foreign file format is not fully convertible by the converter 120, the foreign file is not accessed by the application program module 115 and no conversion is attempted. If the pre-recognition function 110 determines that the foreign file format is fully convertible by the converter 120, the foreign file 105 is accessed by the application program module 115. When the application program module 115 accesses the foreign file 105, the converter 120 is called to convert the foreign file format to the native file format. The converter 120, in turn, calls the recognition function 125. Since it has already been pre-determined that the foreign file format is fully convertible by the converter, the recognition function 125 will also determine that the foreign file format is fully recognizable by the converter 120. Upon receiving a response from the recognition function 125, the converter 120 converts the foreign file 105 to a native file 130, having the native file format

EXEMPLARY OPERATING ENVIRONMENT

Figure 2:
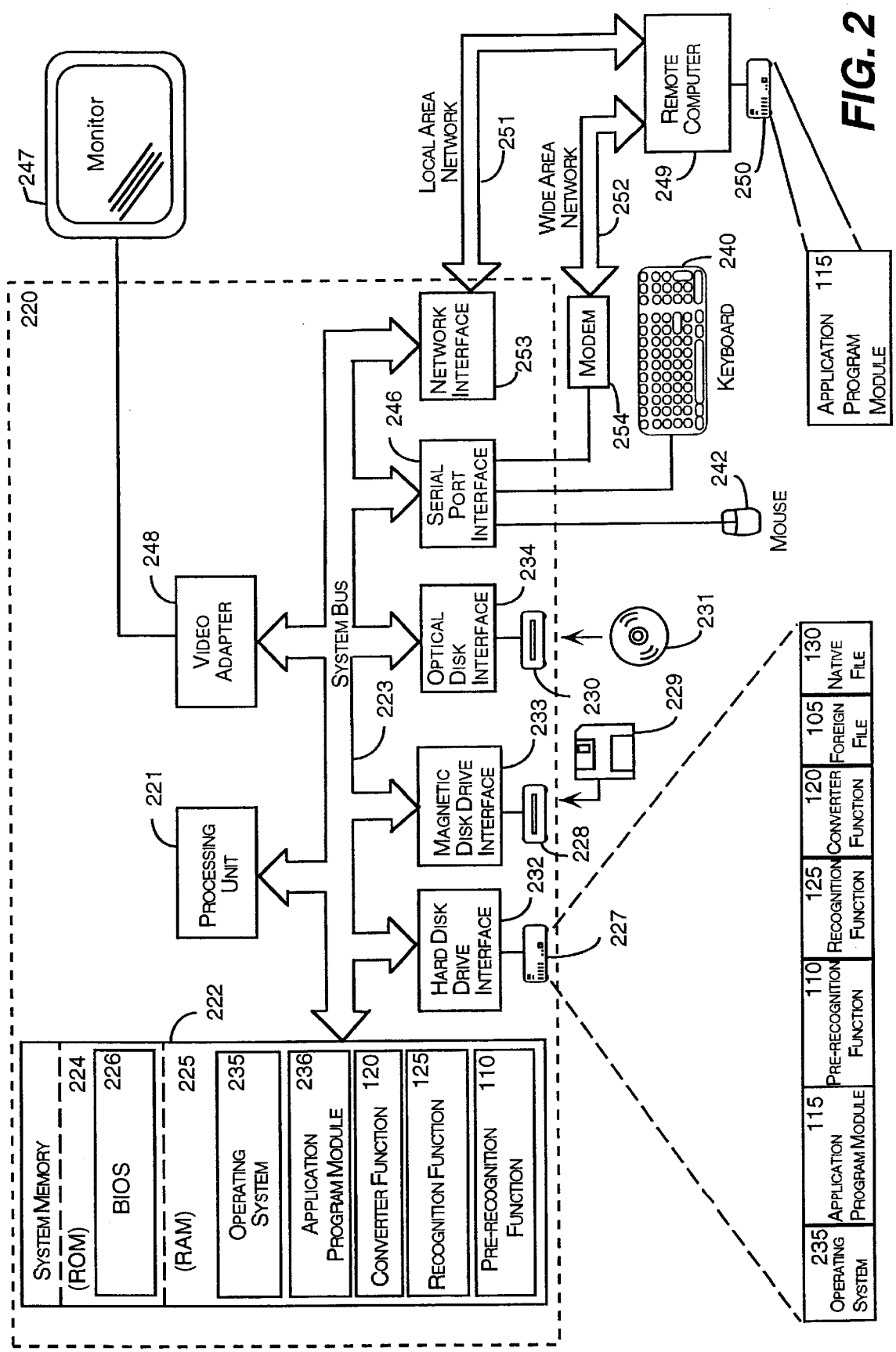
FIG. 2 is a functional block diagram of a computer system that provides an operating environment for the exemplary embodiments of the present invention.

FIG. 2 and the following discussion are intended to provide a brief, general description of a suitable computing environment in which the present invention may be implemented. While the present invention will be described in the general context of a program module, for determining whether a foreign file format is fully convertible to a native file format by a converter of a host program module, that runs on an operating system in conjunction with a personal computer system, those skilled in the art will recognize that the invention may be implemented in combination with other program modules. Generally, program modules include functions, routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 220, including a processing unit 221, a system memory 222, and a system bus 223 that couples the system memory 222 to the processing unit 221. The system memory 222 includes read only memory (ROM) 224 and random access memory (RAM) 225. A basic input/output system 226 (BIOS), containing the basic routines that help to transfer information between elements within the personal computer 220, such as during start-up, is stored in ROM 224.

The personal computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage for the personal computer 220 and, in particular, for one or more foreign files 105 and/or native files 130. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, and one or more program modules. With respect to the present invention, program modules include application program module 115, and the pre-recognition function 110. Application program module 115 may comprise a converter function 120 and a recognition function 125.

The personal computer 220 may include various input devices, such as keyboard 240 and mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a game port or a universal serial bus (USB). A monitor 247 or other type of display device is also connected to the system bus 223 via an interface, such as a video adapter 248. In addition to the monitor, personal computers typically include other peripheral output devices (not shown), such as speakers or printers.

The personal computer 220 may operate in a networked environment using logical connections to one or more remote computers, such as a remote computer 249. The remote computer 249 may be a server, a router, a peer device or other common network node, and typically includes many or all of the elements described relative to the personal computer 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets and the Internet.

When used in a LAN networking environment, the personal computer 220 is connected to the LAN 251 through a network interface 253. When used in a WAN networking environment, the personal computer 220 typically includes a modem 254 or other means for establishing communications over the WAN 252, such as the Internet. The modem 254, which may be internal or external, is connected to the system bus 223 via the serial port interface 246. In a networked environment, program modules depicted relative to the personal computer 220, or portions thereof, may be stored in the remote memory storage device. It will be appreciated that the network connections shown are exemplary and other means of establishing a communications link between the computers may be used. It will be further appreciated that the invention could equivalently be implemented on host or server computers other than personal computers, and could equivalently be transmitted to the host computer by means other than a CD-ROM, for example, by way of the network connection interface 253.

Notwithstanding the broad applicability of the principles of the invention described above, it should be understood that the configuration of the exemplary embodiment as a program module for widely-used personal computers provides significant advantages. In particular, a pre-recognition function 110 comprising computer-implemented instructions for performing the exemplary method of the present invention specifically designed to exhibit acceptable memory-use and performance characteristics when implemented on the conventional personal computer system 220.

In so configuring the recognition function 110, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

OPERATION OF AN EXEMPLARY EMBODIMENT

An exemplary embodiment may be configured not only to determine whether a foreign file is in a file format that may be fully converted by an application program module, but also to determine whether the foreign file is in a particular file format. In this regard, it is contemplated that the exemplary embodiment may be configured so that only files of a specified foreign file format will be converted to a specified native file format. In particular, the exemplary embodiment is a program module having computer executable instructions for automatically converting a file from a foreign WordPerfect format to a native WORD format. Therefore, the exemplary embodiment is operable to pre-determine whether a foreign file is in a WordPerfect format, which can be recognized by the WORD application program module and converted to the native WORD format.

For the sake of efficiency, the exemplary embodiment leverages existing converter functionality in an application program module, such as WORD. To leverage existing converter functionality, the exemplary embodiment provides computer-implemented instructions to interact with and manipulate the existing converter functionality. Still, it is contemplated that a set of computer-implemented instructions may be created to accomplish all of the conversion functions that will be hereinafter described. Specifically, those having ordinary skill in the art will understand how to implement a converter program module that is able to convert a foreign file format to a native file format and a native file format to a foreign file format.

While the description of the exemplary embodiment may include elements and method steps that may be unique to a WordPerfect format-to-WORD format conversion, those skilled in the art will appreciate that the elements or steps may be easily modified to accomplish another type of file conversion. Such modifications are considered to be within the scope of the present invention. Also, as previously noted, there is no requirement that any foreign file format, i.e., WordPerfect, be specified for conversion. The present invention may be configured to pre-determine whether the foreign file is in any foreign file format that is fully convertible by the converter of the application program.

Further, it is possible for an application program to have more than one native file format. Several file formats are often compatible with an application program. For example, files in HTML format are also compatible with, and considered herein, to be native to the WORD application program. Thus, the present invention contemplates that both the foreign and native file formats involved in a conversion may be specified to be inclusive or exclusive. The specification of the foreign file format and/or the native file format may be hard-coded into the exemplary embodiment or specified via user input prior to the conversion. In addition to specifying the foreign file format and the native file format, the user may also be provided with the option to specify the directory, or memory location, into which the converted files are to be stored. The user may further be provided with the ability to select the directory into which the original files are to be archived, or the option to delete the original files.

Figure 3:
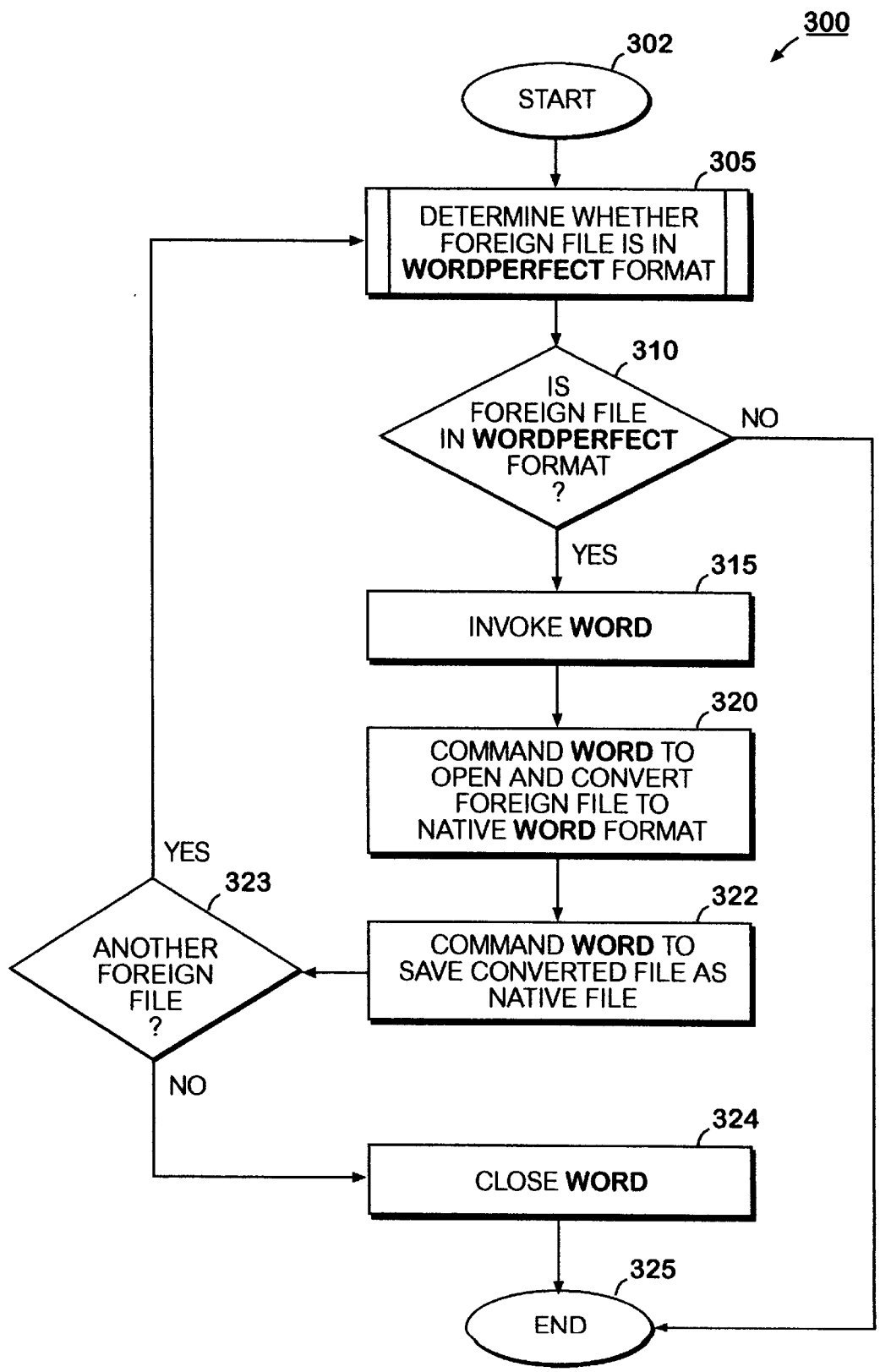
FIG. 3 is a flow chart that illustrates the general operation of an exemplary embodiment of the present invention.

FIG. 3 provides a flowchart of the general steps completed by an exemplary embodiment to convert a foreign file format to a native file format. The process begins at step 302 and proceeds to routine 305, where a pre-recognition function determines whether a foreign file is in WordPerfect format. The operation of the pre-recognition function will be described in detail below with respect to FIG. 4. Next, the process proceeds to decision block 310. If the foreign file is not in WordPerfect format, no conversion will be attempted and the process is terminated at step 325. If the foreign file is in WordPerfect format, the process continues to step 315, where the WORD application program module is invoked. If WORD application program module happens to already be invoked, step 315 becomes unnecessary.

The next step in the process is step 320, where the WORD application program module is commanded to access and convert the foreign file to the native WORD format. In its normal operation, WORD will automatically call an internal converter. The internal converter includes a recognition function called IsFormatCorrect32(), which is operative to determine whether the foreign file is in WordPerfect format and thus, fully convertible by the converter. Since it has already been pre-determined that the foreign file is fully convertible by the converter, the operation of the recognition function IsFormatCorrect32() is trivial and conversion to the native WORD format will be successful. Next, at step 322, the WORD application program module is commanded to save the converted file as a native file. After saving the native file, a determination is made at step 323 as to whether there are any other foreign files to be converted. If there is another foreign file to be converted, the exemplary process 300 returns to step 305 and performs another iteration.

As such, exemplary process 300 is repeated for every foreign file that is selected for conversion. The user may select one or more foreign files to be converted, or the user may select a directory of files and allow the exemplary process 300 to identify, via routine 305, which files in the directory are in WordPerfect format. Optionally, routine 305 may operate on a single foreign file and then pass control to step 310, so that the foreign file may be converted. Alternatively, a plurality of files may be operated on by routine 305 prior to control being passed to step 310. Those skilled in the art will appreciate that the exemplary embodiment may also be configured to include additional features, such as the ability to recourse sub-directories to identify fully convertible foreign files and the ability to recognize pause/resume commands during the pre-recognition and/or conversion process. When it is determined at step 323 that there are no other foreign files to be converted, the WORD application program module is closed at step 324 and the process is terminated at step 325. Those skilled in the art should realize that the closing of the WORD application program module is not a necessary step in the process.

Figure 4:
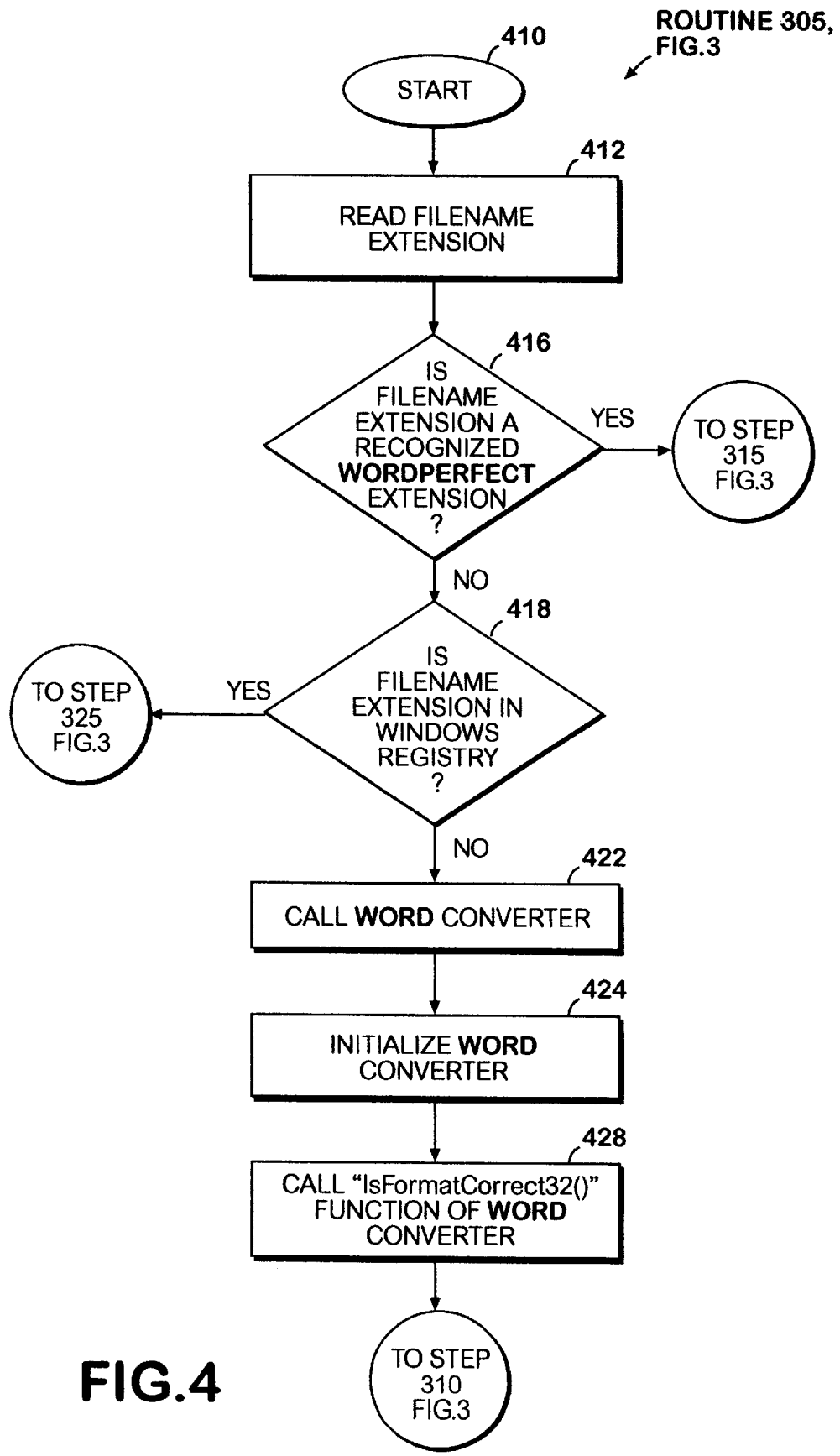
FIG. 4 is a flow chart that shows the computer-implemented steps completed by an exemplary pre-recognition function, in accordance with the present invention.

FIG. 4 is a flowchart specifying the details of routine 305, from FIG. 3. As mentioned, routine 305 involves operation of the pre-recognition function to pre-determine whether the foreign file format will be fully convertible by the WORD application program module. Routine 305 begins at step 410 and proceeds directly to step 412, where an examination is made of the filename extension of the foreign file. Next, the routine proceeds to decision block 416, where a determination is made as to whether the filename extension is a recognized WordPerfect extension. Often times, standard filename extensions are used to identify files created by a particular application program module. For example, WordPerfect files are often identified by a ".wpd" extension. However, it is also common for WordPerfect files to have non-standard, or ambiguous, filename extensions. In addition, WordPerfect files are often not identified by any filename extension at all. If, at decision block 416, the foreign filename extension is recognized as a common WordPerfect extension, the routine exits to step 315 (FIG. 3), where the WORD application program module is invoked to open and convert the foreign file.

If, however, the foreign filename extension is not recognized as a common WordPerfect extension, the routine proceeds from decision block 416 to decision block 418. At decision block 418, a determination is made as to whether the foreign filename extension is registered in the Windows registry under HKEY_CLASSES_ROOT. The Window's registry is a registry that is typical of most operating systems and contains a record of all system files and their corresponding filename extensions. If the foreign filename extension is registered in the Window's registry for an application other than WordPerfect, the foreign file is not considered to be a WordPerfect file and is ignored. In such a case, routine 305 and process 300 are terminated at step 325. If the foreign filename extension is not registered in the Windows registry, the foreign file format remains unknown. Therefore, in order to determine whether the foreign file is in the WordPerfect format, the internal structure of the foreign file is examined.

In order to examine the internal structure of the foreign file, the exemplary embodiment leverages the existing converter incorporated in the WORD application program module. Specifically, the exemplary embodiment takes advantage of the existing recognition function IsFormatCorrect32() included in the converter of the WORD application program module. The recognition function IsFormatCorrect32() already includes the functionality to determine whether a foreign file format is in the WordPerfect format. The recognition function IsFormatCorrect32()is able to recognize many versions of the WordPerfect format, including WordPerfect 4.x, WordPerfect 5.x, and WordPerfect 6.x. Therefore, instead of providing another function with the same functionality to recognize WordPerfect format, the exemplary embodiment accesses the existing recognition function IsFormatCorrect32()without actually operating the WORD application program.

In step 422, the exemplary embodiment calls the existing WORD converter. In step 424, the converter is initialized by calling a function referred to as Initialize32(). Next, in step 428, the recognition function IsFormatCorrect32() is called to determine whether the foreign file is in WordPerfect format. The IsFormatCorrect32() function will return a "1" if the file is considered to be in WordPerfect format. If the IsFormatCorrect32() function returns any value other than "1" the foreign file is not is WordPerfect format. The value returned by the recognition function IsFormatCorrect32() function in step 428, is passed to step 310, FIG. 3.

Those skilled in the art will appreciate the present invention is not limited in scope to a pre-recognition function that accesses an existing recognition function from the converter of the WORD application program module. The pre-recognition function may be modified to access an existing recognition function from the converter of any other application program module. Optionally, an entirely new pre-recognition function may be created to determine whether a foreign file is in a particular file format, or otherwise fully convertible by a particular application program module.

In an alternate embodiment, the pre-recognition function may be configured to identify all foreign files in a directory that are recognizable to each application program module in a suite of application program modules. For example, Microsoft Corporation's Office suite includes several application program modules, including WORD, Excel, PowerPoint, Access, Outlook, etc. The pre-recognition function may be configured to examine the filename extensions of all foreign files and to assign each recognized file to the appropriate application program module for conversion. Generally, only foreign files in the WordPerfect format are likely to have an unknown filename extension. Therefore, all foreign files that are not recognized by their filename extensions may be examined using the IsFormatCorrect32() recognition function from the converter of the WORD application program module. Foreign files that are determined by the IsFormatCorrect32()recognition function to be in the WordPerfect format are assigned to the WORD application program module for conversion. No conversion is attempted for any file that is not recognized by filename extension nor determined by the IsFormatCorrect32() recognition function to be in the WordPerfect format.

In view of the foregoing, it will be appreciated that the present invention provides a method and system for determining, without user interaction, whether a foreign file is in a particular foreign file format. The present invention can determine whether a foreign file is fully convertible to a native file, prior to an attempted conversion of the file by an application program. Further, the present invention can support the automatic selection of fully convertible files for a batch conversion. It should be understood that the foregoing relates only to the exemplary embodiments of the present invention, and that numerous changes may be made thereto without departing from the spirit and scope of the invention as defined by the following claims.

What is claimed is:

1. A method for converting a file having an internal file structure from a foreign file format to a native file format of an application program module, the application program module including a converter for performing file conversion, the method comprising the computer-implemented steps of:

A) prior to attempting a conversion of the file with the application program module, examining without user interaction the internal file structure to determine that the file is in the foreign file format; and B) commanding the application program module to access the file, the application program module operable to call the converter to convert the file from the foreign file format to the native file format.

2. A method for converting a file from a foreign file format to a native file format of an application program module, the file having an internal file structure, and a filename extension, the method comprising the computer-implemented steps of:

A) examining the filename extension to determine whether the file is in the foreign file format;

B) if no determination is made from the filename extension as to whether the file is in the foreign file format, examining the internal file structure to determine whether the file is in the foreign file format; and C) if a determination is made, either from the filename extension or from the internal file structure, that the file is in the foreign file format, commanding the application program module to access the file, the application program module having a converter that is operable to open and to convert the file to the native file format.

3. The method of claim 2, wherein step A comprises the computer-implemented steps of:
- determining that the filename extension does not indicate that the file is in the foreign file format;
- determining that the filename extension is not found within a registry of system extensions; and
- concluding that no determination can be made from the filename extension as to whether the file is in the foreign file format.

4. The method of claim 2, wherein step A comprises the computer-implemented steps of:
- determining that the filename extension indicates that the file is in the foreign file format; and
- concluding that the file is in the foreign file format.

5. The method of claim 2, wherein step A comprises the computer-implemented steps of:
- determining that the filename extension is found within a registry of system extensions; and
- concluding that the file is not in the foreign file format.

6. The method of claim 2, wherein step B comprises the computer-implemented steps of:
- without operating the application program module, calling the converter to determine whether the file is in the foreign file format.

7. A computer-readable medium having stored thereon computer-executable instructions for performing the method of claim 2.

8. A computer system for converting a directory of files from a foreign file format to a native file format, the files each having an internal file structure and a filename extension, the system comprising:
- a memory for storing the directory of files;
- an application program module residing in the memory having a converter for performing file conversion; and
- a processing unit, coupled to the memory and responsive to execution of the application program module, operable for each of the files to:
  - A) examine the filename extension to determine whether the file is in the foreign file format;
  - B) if no determination is made from the filename extension as to whether the file is in the foreign file format, examine the internal file structure to determine whether the file is in the foreign file format; and
  - C) if a determination is made, either from the filename extension or from the internal file structure, that the file is in the foreign file format, command the application program module to open and convert the file to the native file format.

9. The computer system of claim 8, wherein the directory of files comprises a sub-directory of files; and
- wherein the processing unit is operable to recourse the sub-directory to operate on all files contained therein.

10. The computer system of claim 8, wherein operation of the processing unit to examine the filename extension to determine whether the file is in the foreign file format comprises:
- determining that the filename extension does not indicate that the file is in the foreign file format;
- determining that the filename extension is not found within a registry of system extensions; and
- concluding that no determination can be made from the filename extension as to whether the file is in the foreign file format.

11. The computer system of claim 8, wherein operation of the processing unit to examine the filename extension to determine whether the file is in the foreign file format comprises:
- determining that the filename extension indicates that the file is in the foreign file format; and
- concluding that the file is in the foreign file format.

12. The computer system of claim 8, wherein operation of the processing unit to examine the filename extension to determine whether the file is in the foreign file format comprises:
- determining that the filename extension is found within a registry of system extensions; and
- concluding that the file is not in the foreign file format.

13. The computer system of claim 8, wherein operation of the processing unit to examine the internal file structure to determine whether the file is in the foreign file format comprises:
- without operating the application program module, calling the converter to determine whether the file is in the foreign file format.

14. A computer system for converting a file from a foreign file format to a native file format, the file having an internal file structure and a filename extension, the system comprising:
- a memory for storing the file;
- an application program module residing in the memory having a converter for performing file conversion; and
- a processing unit, coupled to the memory and responsive to execution of the application program module, operable to:
  - prior to attempting a conversion of the file with the application program module, examine without user interaction the internal file structure to determine that the file is in the foreign file format; and
  - command the application program module to access the file, the application program module operable to call the converter to convert the file from the foreign file format to the native file format.

15. The computer system of claim 14, wherein operation of the processing unit to examine the internal file structure to determine that the file is in the foreign file format comprises:
- without operating the application program module, call the recognition function to determine that the file is in the foreign file format.

* * * * *